United States Patent [19]

Vanderlaan et al.

[11] Patent Number: 4,612,526
[45] Date of Patent: Sep. 16, 1986

[54] TORQUE MOTOR WITH HIGH TORQUE POLES AND MAGNETIC CENTERING SPRING ADJUSTMENT

[75] Inventors: Robert D. Vanderlaan; William H. Eiszner, Jr., both of Kalamazoo, Mich.

[73] Assignee: Pneumo Corporation, Boston, Mass.

[21] Appl. No.: 685,036

[22] Filed: Dec. 21, 1984

[51] Int. Cl.⁴ .............................................. H01F 7/08
[52] U.S. Cl. .................................. 335/229; 335/274; 310/36
[58] Field of Search ............... 335/229, 230, 266, 267, 335/272, 274; 310/29, 36

[56] References Cited

U.S. PATENT DOCUMENTS

| | | | |
|---|---|---|---|
| 2,767,357 | 10/1956 | Naybor | 335/272 |
| 3,157,803 | 11/1964 | Graydon | 335/229 X |
| 3,201,661 | 8/1965 | Koutnik | 335/272 X |
| 3,234,436 | 2/1966 | Bieger | 310/36 X |
| 3,694,782 | 9/1972 | Ray | 335/230 |
| 4,287,457 | 9/1981 | Takemura | 310/36 X |

*Primary Examiner*—George Harris
*Attorney, Agent, or Firm*—Renner, Otto, Boisselle & Lyon

[57] ABSTRACT

A two-pole limited angle torque motor including a rotor assembly having one or more permanent rotor magnets and a stator assembly including a stator coil and a pair of circumferentially spaced stator pole structures. Each pole structure includes a generally axially extending stator pole blade about which the stator coil circumferentially extends. A radially outwardly extending flange is at one end of one of the stator pole structures and at the opposite end of the other stator pole structure. The stator pole blades have a greater radial thickness adjacent the flanges thereof than at the opposite end of the blade to reduce the magnetic flux density of the stator pole structures in the region of the blades adjacent the flanges thereof. Also, the axial outer end faces of the flanges desirably protrude axially outwardly adjacent the radial inner ends thereof to make use of the fringing fields of the rotor magnet at the ends of the rotor assembly to increase the reluctance torque of the motor. At the ends of the stator assembly opposite the stator pole flanges on opposite sides of the rotor assembly are additional stator pole pieces. The blades of the stator pole structures terminate short of the other ends of the rotor magnet to provide room for the additional stator pole pieces at such other ends for a given rotor length whereby the motor has a substantially higher reluctance torque without significantly reducing the torque due to interaction of magnetic fields. Surrounding the stator assembly is an outer magnetic housing comprising two semi-cylindrical parts with air gaps between opposite sides thereof, said housing parts being rotatable relative to each other to change the size of one gap relative to the other or otherwise machinable to change both gaps equally for adjusting the reluctance torque of the motor.

30 Claims, 4 Drawing Figures

TORQUE MOTOR WITH HIGH TORQUE POLES AND MAGNETIC CENTERING SPRING ADJUSTMENT

BACKGROUND OF THE INVENTION

This invention relates generally as indicated to a torque motor with high torque poles and magnetic centering spring adjustment.

The motor of the present invention relates to certain improvements in a limited angle torque motor generally of the type disclosed in copending U.S. application Ser. No. 579,784, filed Feb. 13, 1984, now U.S. Pat. No. 4,510,403 the disclosure of which is incorporated herein by reference. Such motor is particularly suited for use in certain types of high pressure fluid proportional servo control systems including, but not limited to, aircraft controls to drive a proportional control valve of relatively short stroke. The fluid pressure is normally on the order of 1,000 psi or more.

In such a motor, it would be desirable to extend the torque versus current characteristic due to the interaction of magnetic fields. Also, it would be advantageous to increase the reluctance torque of the motor for a given rotor length and to provide a simple means for adjusting the reluctance torque. Finally, it would be desirable to provide such a motor with a high closing torque versus opening torque at a given current level.

SUMMARY OF THE INVENTION

In accordance with one aspect of the invention, the motor includes a rotor assembly having one or more permanent magnets and a stator assembly including a stator coil and a pair of circumferentially spaced stator pole structures. Each stator pole structure includes a generally axially extending stator pole blade about which the stator coil circumferentially extends, and a radially outwardly extending flange at one end of one of the stator pole structures and at the opposite end of the other stator pole structure. The stator pole blades have a greater radial thickness adjacent the flanges thereof than at the opposite ends of the blades to reduce the magnetic flux density of the stator pole structures in the region of the blades adjacent the flanges thereof.

In accordance with another aspect of the invention, the axial outer end faces of the stator pole flanges desirably protrude axially outwardly adjacent the radial inner ends thereof to make use of the fringing fields of the rotor magnet at the ends of the rotor assembly to increase the reluctance torque of the motor.

In accordance with yet another aspect of the invention, additional stator pole pieces are provided at the ends of the stator assembly opposite the stator pole flanges on opposite sides of the rotor assembly. The blades of the stator pole structures terminate short of the other ends of the rotor magnet to provide room for the additional pole pieces at such other ends for a given rotor length thereby providing the motor with a substantially higher reluctance torque without significantly reducing the torque due to interaction of magnetic fields.

In accordance with still another aspect of the invention, an outer magnetic housing comprising two semi-cylindrical parts with air gaps between opposite sides thereof surrounds the stator assembly, said housing parts being rotatable relative to each other to change the size of one gap relative to the other for adjusting the reluctance torque of the motor.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
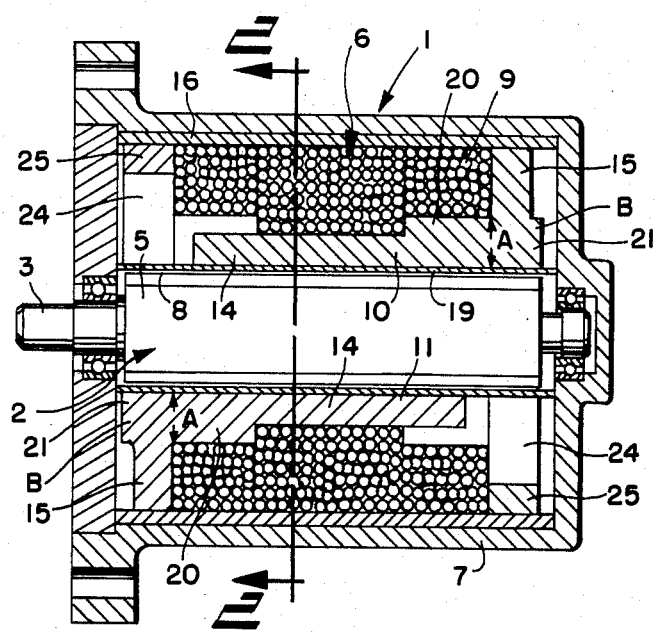
FIG. 1 is a fragmentary longitudinal section through a preferred form of limited angle torque motor in accordance with the present invention.
Figure 2:
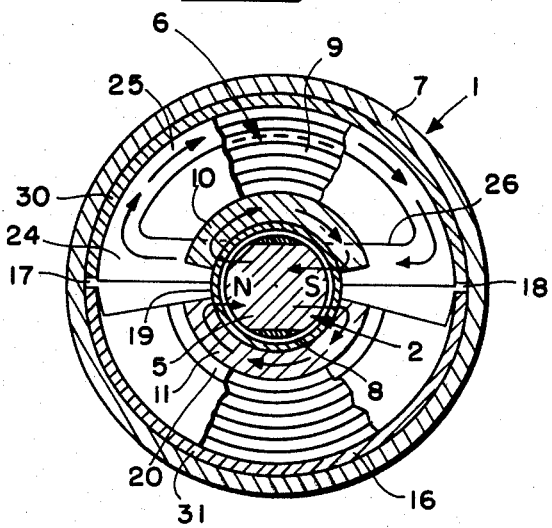
FIG. 2 is a fragmentary transverse section through the motor of FIG. 1, taken substantially along the plane of the line 2—2 thereof.

Referring now in detail to the drawings and initially to FIGS. 1 and 2, a preferred form of limited angle torque motor in accordance with this invention is generally indicated by the reference numeral 1. Such motor is primarily intended for use in high pressure fluid systems for directly driving a valve in proportional servo control systems including, but not limited to, aircraft controls. However, it should be understood that such motor could also be used for driving secondary valves as well as other mechanical devices.

As shown, the motor is a non-commutated two-pole stationary coil rotary magnetic motor generally of the type disclosed in the aforementioned copending application Ser. No. 579,784. Such motor consists of a rotor assembly 2 including a rotor shaft 3 having one or more permanent magnets 5 intermediate the ends thereof, and a stator assembly 6 surrounding the rotor assembly. The rotor magnet 5 is magnetized in the diametrical direction so that the North and South poles N and S are diametrically oriented as illustrated in FIG. 2.

The rotor shaft may be suitably journaled within a rotor housing 7 for rotation of the rotor assembly 2 relative to the stator assembly 6. A relatively small flux path clearance 8 separates the rotor and stator assemblies, thereby permitting rotation of the rotor assembly relative to the stator assembly through its rotational angle range. The stator assembly includes one or more high density layer wound stator coils 9 circumferentially extending around a pair of magnetic stator pole structures 10, 11 with the axis of the stator windings being generally parallel to the rotor axis.

As will be apparent from the drawings, the stator pole structures 10, 11 are circumferentially spaced from each other, and each includes an axially extending pole blade 14 and a flange 15 extending radially outwardly from one end only of each pole structure, such flanges being at opposite ends of the respective pole structures.

The stator pole flanges 15 are integral with the stator pole blades 14 and desirably extend radially outwardly into contact with the overlapping inner surface of an outer magnetic housing 16 surrounding the stator assembly. The magnetic housing is made of a suitable magnetic material such as soft iron, and provides a magnetic return path for the magnetic field when the stator coil is excited. Such magnetic return path may be partially interrupted by providing one or more air gaps 17, 18 in the outer magnetic housing as shown in FIG. 2.

The stator pole structures 10, 11 may be centrally supported by a suitable stator support sleeve 19 which is desirably made from a material having high electrical conductivity such as beryllium copper that produces significant eddy current damping for system dynamic requirements and is also sufficiently strong to withstand any internal fluid pressures that the stator assembly may be subjected to.

Figure 4:
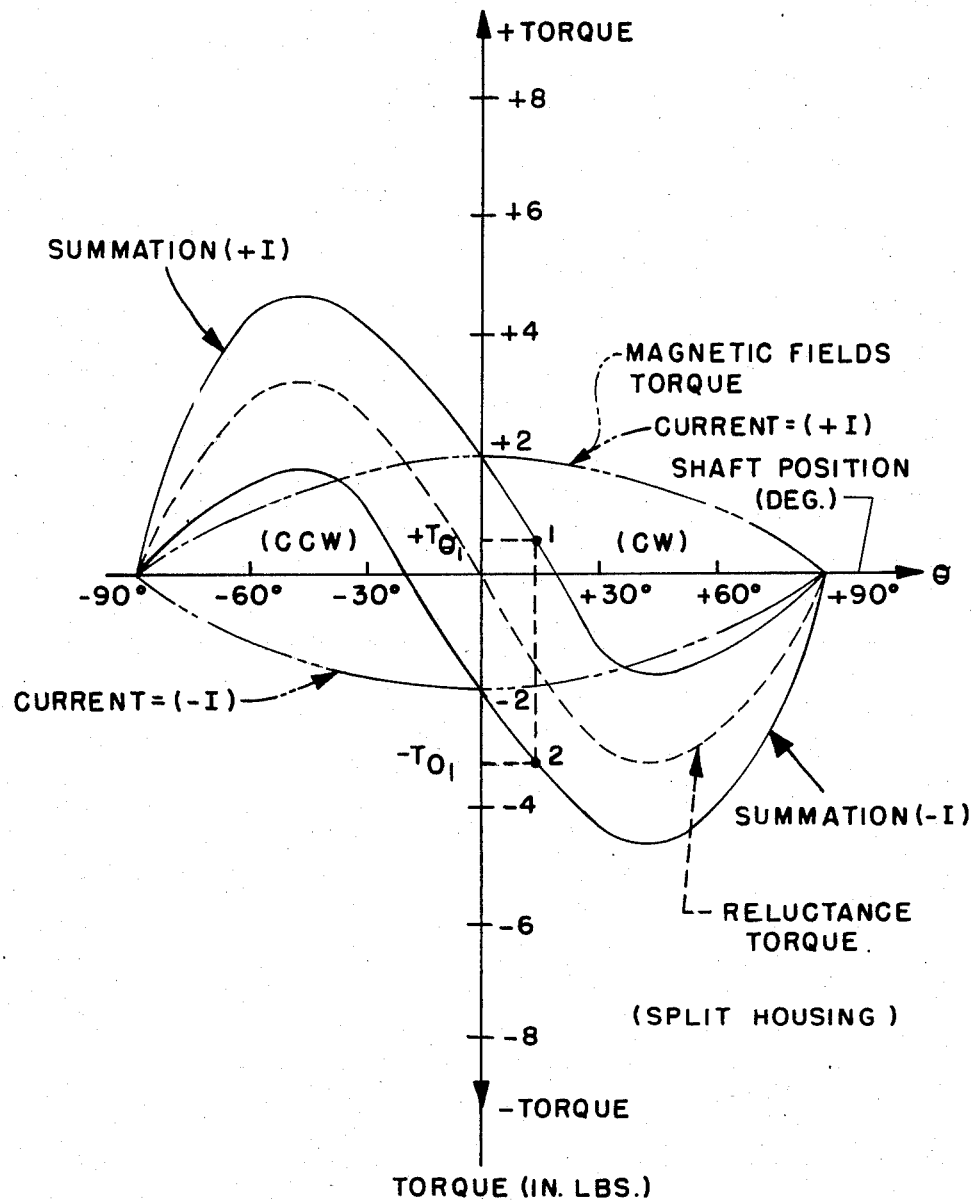
FIG. 4 is a graphic representation of the net torque summation of the magnetic fields torque developed by applying a positive and negative current to the stator coil and the magnetic reluctance centering torque produced by the rotor magnet for a representative motor constructed in accordance with this invention.

When the stator coil 9 is excited by a direct or pulse width modulated current applied thereto, the stator magnetic pole flanges will cause a cross or transverse flux through the stator and rotor assemblies 2, 6 which produces a turning torque in the motor. FIG. 4 graphically illustrates the general torque versus angular shaft position profile of a representative motor constructed in accordance with this invention when a current of $\pm I$ is applied to the stator coil. As illustrated, when a positive current ($+I$) is applied, a positive torque tending to rotate the rotor assembly in a clockwise direction is produced over a relatively large excursion of the rotor shaft which varies, for example, from a maximum torque output at the null or centered position of the rotor shaft ($\theta = 0°$) to approximately 50% of the maximum torque output at $\pm 60°$ of rotation of the rotor shaft from such centered or null position. Conversely, when a negative current ($-I$) is applied, a negative torque tending to rotate the rotor shaft in a counter-clockwise direction is produced over the same excursion of the rotor shaft.

Preferably the stator pole structures 10, 11 are made as thin as practical to maximize the number of coil windings (i.e. ampere turns) for a given space within the stator assembly. However, if the stator pole structures are made too thin, as the rotor displacement is increased from the null or centered position shown in FIG. 2, the magnetic material in the regions A (FIG. 1) at the ends of the stator pole blades 14 from which the stator pole flanges 15 extend will saturate too quickly, thereby reducing the component of the magnetic field due to the coil ampere turns. This in turn reduces the interaction of magnetic fields torque that can be produced by the motor.

Figure 3:
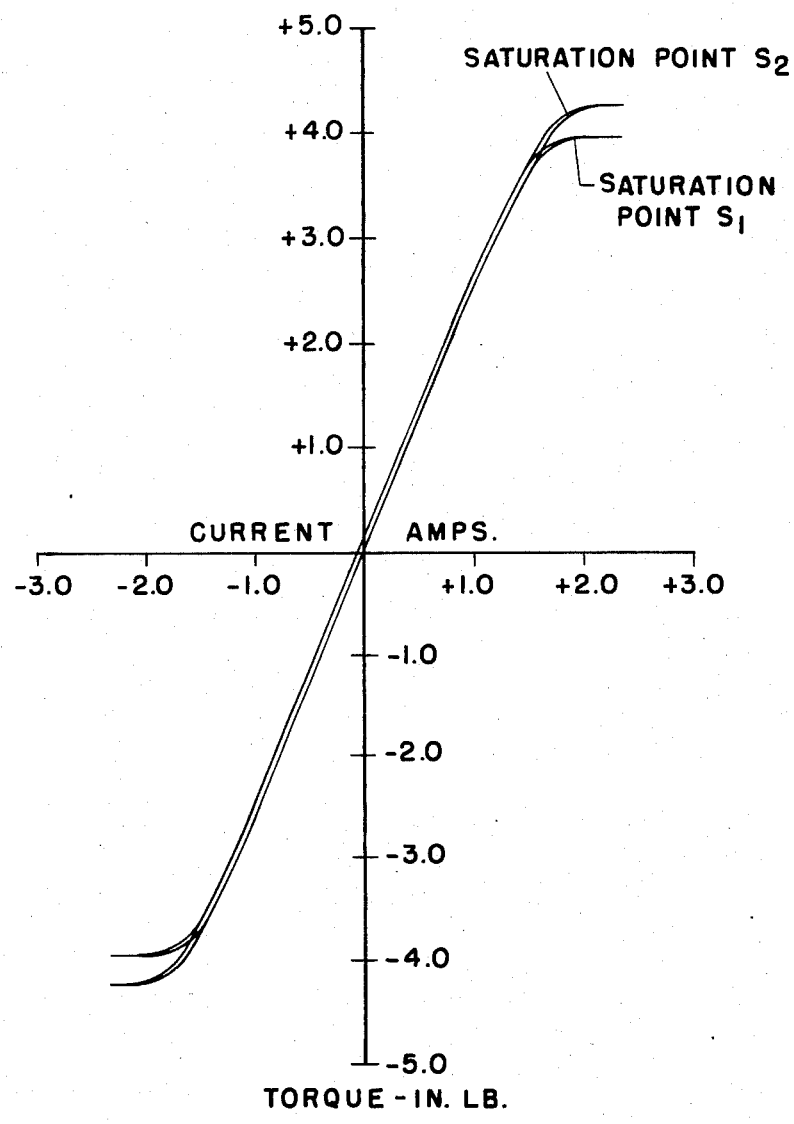
FIG. 3 is a graphic illustration showing the motor shaft position for different levels of applied direct or pulse width modulated current for a representative motor constructed in accordance with this invention.

FIG. 3 shows the interaction of magnetic fields torque for different levels of applied current for a representative motor constructed in accordance with this invention. As the graph of FIG. 3 clearly illustrates, the saturation point $S_1$ (which occurs in the region A of the stator pole structures) is a rather sharply defined knee, which may be used as a magnetic stop to establish the maximum rotational stroke of the motor shaft for a given stator design.

In accordance with one aspect of the invention, the torque versus current characteristic of the motor can be increased by increasing the magnetic cross-sectional area of the stator pole blade 14 of each stator pole structure 10, 11 in the region A immediately adjacent the axial inner face of the radial flange 15 thereof. This reduces the magnetic flux density in such region and thereby increases the maximum output torque of the rotor shaft for a given stator design at which the saturation point $S_2$ is reached as further graphically illustrated in FIG. 3.

Referring further to FIG. 1, each stator pole blade 14 is preferably made radially thicker by providing an enlarged step 20 for a portion of the length thereof commencing at the radial flange. As an example, the stator pole blade may be provided with a thickness of approximately one and one-half times the thickness of the remaining blade portion over a length of approximately one-fourth to one-third the free length of the stator pole blade commencing at each stator pole flange. Such increased radial thickness for a portion of the length of the stator pole blade will provide the desired reduction in the magnetic flux density without significantly reducing the coil window area between the stator pole structures and magnetic housing for the coil windings so as to minimize the reduction in the number of coil windings in the motor itself.

In addition to the interaction of magnetic fields torque developed when the electro-magnetic stator coil 9 is excited, a magnetic reluctance torque is developed by the magnetic flux produced by the permanent rotor magnet 5 that tends to keep the rotor assembly at the midpoint of its rotational angle range shown in FIG. 2. As the rotor shaft is rotated by an external force, the magnetic reluctance torque develops a restoring torque which varies in magnitude with rotation and acts in opposition to the applied external force tending to return the rotor North and South poles to the original centered position as also graphically illustrated in FIG. 4. Such magnetic reluctance torque produced by the magnetic flux may be used to provide a centering function for the rotor shaft tending to return the rotor shaft to the position $\theta = 0°$ shown in FIG. 4 whenever the current to the stator coil is interrupted.

In accordance with another aspect of the invention, the reluctance torque of the motor can be increased by providing additional magnetic material in the regions B on the axial outer end faces of the stator pole flanges to make use of the fringing fields of the permanent magnet 5 at the ends of the rotor assembly 2. In the preferred form of motor construction disclosed herein, a shoulder portion 21 is provided on the axial outer face of each stator pole flange 15 which extends from the radial inner edge thereof approximately one and one-half times the thickened portions of the stator pole blades or approximately equal to the thickness of the enlarged step 20 of the blades. Also, such shoulder portions 21 desirably have an axial thickness of approximately one and one-quarter to one and one-half times the axial thickness of the radial outer end of the radial flanges.

Further in accordance with the invention, an additional centering reluctance torque can be produced by providing in place of the usual nonmagnetic end plates at the ends of the stator assembly opposite the stator pole flanges, one-half of a solid magnetic pole piece 24 at such ends on opposite sides of the rotor assembly. As best seen in FIG. 2, each such pole piece 24 consists of a half outer ring 25 structure of highly permeable soft magnetic iron having radially inwardly extending pole extensions 26 at opposite ends of the half ring which terminate in closely spaced relation to the rotor magnet 5.

The additional reluctance torque produced by such additional pole pieces 24 is proportional to the axial length of such additional pole pieces. Accordingly, such reluctance torque can be further increased by decreasing somewhat the length of the stator pole blades 14 and eliminating a portion of the coil radially outwardly of the removed stator pole blade end portions to accommodate longer pole pieces 24 for a given rotor length. In actual tests, it has been found that removal of a small portion of the length of the stator pole blades, for example one-sixth to one-fifth the length thereof, and the surrounding coil portion does not significantly reduce the torque due to interaction of magnetic fields, but does provide a substantially higher reluctance torque.

The interaction of magnetic fields torque developed by applying current to the stator coil combines with the magnetic reluctance torque produced by the rotor magnet 5 to provide a net torque output for the motor at various angular shaft positions which will vary depending on the magnetic reluctance torque profile for a given motor design. FIG. 4 shows the net torque summation resulting from the application of a positive and negative current $\pm I$ to a motor having a centering reluctance torque capability. As will be apparent, sufficient direct or pulse width modulated current must be applied to the stator coil to produce an interaction of magnetic fields torque which is sufficiently greater than that consumed in overcoming the magnetic reluctance torque to obtain the desired useful work output over the required angle of rotation of the rotor shaft.

In the example shown in FIG. 4, the rotor shaft has a maximum travel of approximately $\pm 20°$ when a current $\pm I$ is applied to the stator coil. Also, as FIG. 4 clearly shows, a very large closing torque can be obtained with a motor constructed in accordance with this invention tending to move the rotor shaft 3 from the fully open position corresponding to $\theta = \pm X°$ to a closed position corresponding to $\theta = 0°$. In FIG. 4 Point 1 represents a typical operating condition in which a positive or opening torque $+T_{\theta 1}$ is available at a positive displacement $\theta_1$ and positive current $+I$. Point 2 illustrates the large negative or closing torque $-T_{\theta 1}$ that is available if the current is reversed with the rotor at the same position $(\theta_1)$. This large torque is due to the space-phase relationships between the reluctance and interaction of magnetic fields torque components illustrated in FIG. 4.

The reluctance torque versus displacement characteristic of the motor can also be adjusted by changing the size of the gaps 17, 18 in the outer magnetic housing 16 to vary the reluctance of the magnetic circuit. This may readily be accomplished in accordance with the present invention by forming the outer magnetic housing 16 in two semi-cylindrical parts 30, 31 with the gaps 17, 18 between each part on opposite sides of the housing. Accordingly, if the two outer housing parts 30, 31 are rotated relative to each other, the size of one gap will be changed with respect to the other gap. Whenever the size of either gap is reduced from the average, the reluctance torque is decreased and the interaction of magnetic fields torque is increased.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A limited angle torque motor comprising a rotor assembly and a stator assembly, said rotor assembly including a rotor shaft mounted for rotation relative to said stator assembly and a permanent rotor magnet mounted for rotation with said rotor shaft, said rotor magnet being diametrically oriented, and said stator assembly including a stator coil and a pair of circumferentially spaced stator pole structures, each said stator pole structure comprising a generally axially extending stator pole blade about which said stator coil circumferentially extends, and a radially outwardly extending flange at one end of one of said stator pole structures and at the opposite end of the other of said stator pole structures, said blades having a greater radial thickness adjacent the respective flanges than at the opposite ends of said blades to reduce the magnetic flux density of said stator pole structures in the region of said blades adjacent said flanges, thereby extending the torque versus current characteristic of said motor due to interaction of magnetic fields.

2. The motor of claim 1 wherein each said blade has an enlarged axially extending step adjacent the respective flange.

3. The motor of claim 2 wherein each said enlarged step extends for a portion of the axial length of the respective blade.

4. The motor of claim 3 wherein each said enlarged step has an axial length of at least one-fourth the total length of said blade.

5. The motor of claim 3 wherein each said enlarged step has an axial length of approximately one-fourth to one-third the total length of said blade.

6. The motor of claim 2 wherein each said enlarged step has a radial thickness approximately one and one-half times the thickness of the remaining length of said blade.

7. The motor of claim 1 wherein said flanges extend radially outwardly from the respective blades adjacent opposite ends of said rotor magnet, and the axial outer end faces of said flanges have additional magnetic material thereon adjacent the radial inner end thereof to make use of the fringing fields of said rotor magnet at the ends of said rotor assembly to increase the reluctance torque of said motor.

8. The motor of claim 7 wherein said flanges have shoulders on the axial outer faces thereof adjacent the radial inner ends of said flanges to provide such additional magnetic material.

9. The motor of claim 8 wherein said flanges in the region of said shoulders have an axial thickness at least one and one-fourth times that of the remaining length of said flanges.

10. The motor of claim 8 wherein said flanges in the region of said shoulders are approximately one and one-quarter to one and one-half times as thick as said flanges radially outwardly of said shoulders.

11. The motor of claim 8 wherein said shoulders extend radially outwardly for a distance of approximately one and one-half times the thickness of the opposite ends of said blades.

12. The motor of claim 7 wherein each said blade has an enlarged axially extending step adjacent the respective flange, each said enlarged step extending for a portion of the axial length of the respective blades.

13. The motor of claim 12 wherein each said enlarged step has an axial length of approximately one-fourth to one-third the total length of the respective blade and a radial thickness of approximately one and one-half times the thickness of the remaining length of the respective blade.

14. The motor of claim 1 wherein said stator assembly further comprises an additional pole structure at the end of said stator assembly opposite one of said stator pole flanges, said additional pole structure comprising one-half of an outer ring having radially inwardly extending pole extensions at the ends of said half ring on opposite sides of said rotor magnet, said extensions terminating in closely spaced relation to said rotor magnet.

15. The motor of claim 14 wherein there is an additional pole structure at each end of said stator pole structures opposite the respective flanges on opposite sides of said rotor assembly.

16. The motor of claim 15 wherein said flanges are in substantial radial alignment with the opposite ends of said rotor magnet, and said blades terminate short of the other ends of said rotor magnet to provide space for said additional pole structures radially outwardly of said other ends.

17. The motor of claim 16 wherein said blades terminate short of the other ends of said rotor magnets to accommodate longer additional pole structures for a given rotor assembly length.

18. The motor of claim 17 wherein said blades have a length approximately one-fifth to one-sixth less than the length of said rotor magnet to provide space at the other ends of said stator pole structures for said additional pole structures.

19. The motor of claim 1 further comprising an outer magnetic housing surrounding said stator assembly, said housing comprising two semicylindrical housing parts having air gaps between opposite sides thereof, said housing parts being rotatable relative to each other to vary the size of one of said gaps relative to the other gap or otherwise machinable to vary both gaps equally for adjusting the reluctance torque of said motor.

20. A limited angle torque motor comprising a rotor assembly and a stator assembly, said rotor assembly including a rotor shaft having a permanent rotor magnet mounted for rotation therewith, said rotor magnet being diametrically oriented, and said stator assembly including a stator coil and a pair of circumferentially spaced magnetic stator pole structures, each said stator pole structure comprising a generally axially extending stator pole blade about which said stator coil circumferentially extends, and a radially outwardly extending flange at one end of one of said stator pole structures and at the opposite end of the other of said stator pole structures, said flanges extending radially outwardly from the respective blades adjacent opposite ends of said rotor magnet, the axial outer end faces of said flanges having additional magnetic material thereon adjacent the radial inner ends thereof to make use of the fringing fields of said rotor magnet at the ends of said rotor assembly to increase the reluctance torque of said motor.

21. The motor of claim 20 wherein said flanges have shoulders on the axial outer faces thereof adjacent the radial inner ends of said flanges to provide such additional magnetic material.

22. The motor of claim 21 wherein said flanges in the region of said shoulders have an axial thickness at least one and one-fourth times that of the remaining length of said flanges.

23. The motor of claim 21 wherein said flanges in the region of said shoulders are approximately one and one-quarter to one and one-half times as thick as said flanges radially outwardly of said shoulders.

24. The motor of claim 21 wherein said shoulders extend radially outwardly for a distance of approximately one and one-half times the thickness of the opposite ends of said blades.

25. A limited angle torque motor comprising a rotor assembly and a stator assembly, said rotor assembly including a rotor shaft having a permanent rotor magnet mounted for rotation therewith, said rotor magnet being diametrically oriented, and said stator assembly including a stator coil and a pair of circumferentially spaced magnetic stator pole structures, each said stator pole structure comprising a generally axially extending stator pole blade about which said stator coil circumferentially extends, and a radially outwardly extending flange at one end of one of said stator pole structures and at the opposite end of the other of said stator pole structures, said flanges extending radially outwardly from the respective blades adjacent opposite ends of said rotor magnet, said stator assembly further comprising an additional magnetic pole structure at one end of said stator assembly opposite one of said stator pole flanges, said additional magnetic pole structure comprising one-half of an outer ring having radially inwardly extending pole extensions at opposite ends of said half ring, said extensions terminating in closely spaced relation to said rotor magnet.

26. The motor of claim 25 wherein there is an additional magnetic pole structure at the ends of said stator pole structures opposite the respective flanges on opposite sides of said rotor assembly.

27. The motor of claim 26 wherein said flanges are in substantial radial alignment with the opposite ends of said rotor magnet, and said blades terminate short of the other ends of said rotor magnet to provide space for said additional magnetic pole structures radially outwardly of said other ends.

28. The motor of claim 27 wherein said blades have a length approximately four-fifths to five-sixths the length of said rotor magnet to provide space at the other ends of said stator pole structures for said additional pole structures.

29. The motor of claim 27 wherein said blades terminate short of the other ends of said rotor magnets to accommodate longer additional pole structures for a given rotor assembly length.

30. A limited angle torque motor comprising a rotor assembly and a stator assembly, said rotor assembly including a rotor shaft mounted for rotation relative to said stator assembly and a permanent rotor magnet mounted for rotation with said rotor shaft, said rotor magnet being diametrically oriented, and said stator assembly including magnetic stator pole structures and a stator coil extending circumferentially around said stator pole structures, and an outer magnetic housing surrounding said stator assembly, said housing comprising two semi-cylindrical housing parts having air gaps between opposite sides thereof, said housing parts being rotatable relative to each other to change the size of one air gap relative to the other for adjusting the reluctance torque of said motor.

* * * * *